Feb. 5, 1935.    A. J. HIXON    1,989,861
CONNECTER FOR CABLES AND CONDUCTORS
Filed Sept. 16, 1933
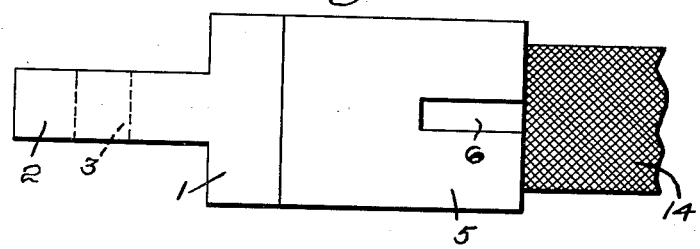
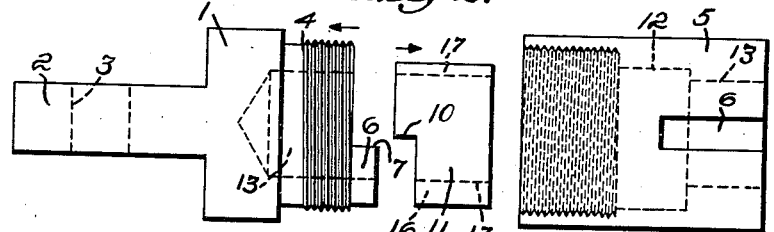
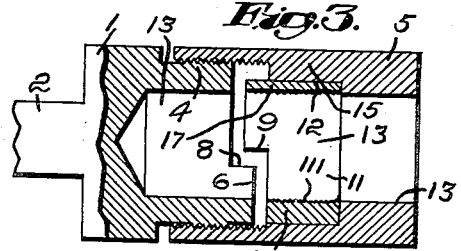
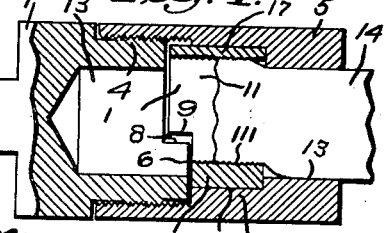
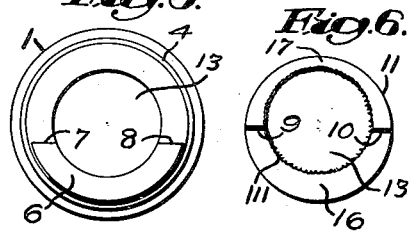
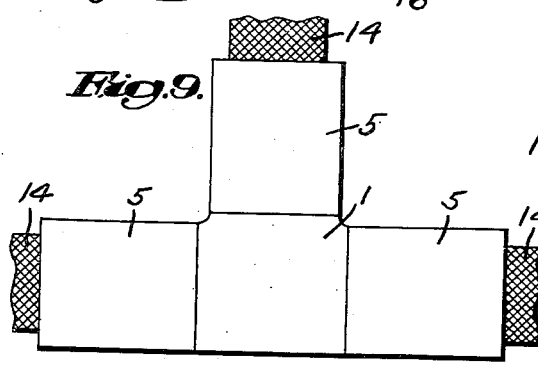
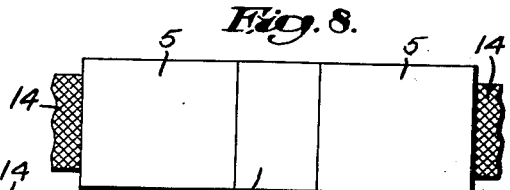
Inventor:
Alfred J. Hixon,
by Emery Booth Varney Townsend
Attys Patented Feb. 5, 1935

1,989,861

UNITED STATES PATENT OFFICE 1,989,861

CONNECTER FOR CABLES AND CONDUCTORS

Alfred J. Hixon, Braintree, Mass.

Application September 16, 1933, Serial No. 689,729

9 Claims. (Cl. 173—263)

This invention relates to couplers or connecters for electrical conductors or rods and cables for any purpose and aims to provide a novel connecter having, among others, the advantages hereinafter described and claimed, and particularly adapted for connecting electric conductors.

In the drawing of one embodiment of my invention illustrated and described herein, Fig. 1 is a side view with a conductor end locked therein, and broken off;

Fig. 2, a diagrammatic view, with the various parts unassembled but positioned axially;

Fig. 3, a longitudinal sectional view with the parts assembled in the same position as in Fig. 2, to receive the connecter end;

Fig. 4, a similar view with the sleeve turned clockwise 180°, or in locking position, on the connecter;

Fig. 5, an end view of the body element, Fig. 2, in the direction of the arrow;

Fig. 6, an end view of the collar, in direction of the arrow, Fig. 2;

Fig. 7, an end view of the sleeve from the left of Fig. 2;

Fig. 8, a plan of a modified form of body provided with a plurality of connecting elements;

Fig. 9, a similar view of a still further modified form of like nature.

Referring first to Figs. 1, 2, my novel connecter comprises a body 1, which may be of any desired form in cross-section and size, in this case cylindrical, and provided at one end with a tang or shank 2 drilled at 3 to receive a bolt or screw for securing it to an anchorage, or other connecting element.

The opposite end of the body 1, Fig. 2, is reduced in diameter to form a neck 4, and in the form shown is threaded to receive the threaded end of a cooperating member, as the sleeve 5, having slots 6 in its outer wall to receive a spanner wrench, or it may be provided with any means for receiving a suitable operating tool. The end of the neck 4, Fig. 2, is cut away circumferentially leaving a stop member or flange 6, with two shoulders, 7, 8, Figs. 2, 3, 5, to cooperate with the shoulders 9, 10, of the similarly fashioned end of a collar 11 which, however, Fig. 2, is of less diameter exteriorly and received in the end of the sleeve 5 which is eccentrically counterbored therefor at 12.

These two elements 1, 5, are drilled to provide a concentric passage 13, while the collar 11 is drilled eccentrically, all of the same diameter, to receive, Fig. 3, when in registering relation, in unlocking position, a connecter or other member as a cable 14, Fig. 1. The drilling of the cable receiving passage 13 of the same diameter through all three members provides for corresponding extension of the cable end therethrough, which is preferred so that the collar 11 may grip the cable between the two spaced areas of support provided by the walls of the two members 1 and 5.

This eccentric passage through the element 11, which may be provided with teeth or corrugations 111 if desired, and counterbore 12 in the element 5, provide these elements with walls of varying thickness which, when assembled, act as cams in their operative relation to and upon each other, as will presently appear.

The shoulders 7, 8 on the neck 4 form stops and limit, to a degree, the movement of the collar 11 on the body 1, and are positioned more than diametrically apart as shown in Fig. 5, to provide tolerance, while the shoulders 9, 10 on the collar 11 are substantially diametrically apart as shown in Fig. 6, so that when the collar 11 is seated against the end of the neck 4, in assembled relation as in Figs. 3 and 4, the collar 11 may not only rotate to a limited degree on the end of said neck, under the friction of the rotating sleeve 5 thereon, when the sleeve is being screwed on or off, but the collar may also have a sliding action on the end of the neck 4 by virtue of the cam-like action of the thick wall or cam portion 15 of the wall of the sleeve 5, Fig. 2, on the similar cam-like wall section 16 of the collar, Fig. 4.

In the disclosed embodiment, in which the threaded connection provides for continuous relative rotation of the members 1 and 5 through a plurality of turns, each turn of the sleeve will cause the thick cam-like wall section 15 of the sleeve to force the like portion 16 of the collar into the passage 13 and against the rod or connecter therein, to grip it firmly. In the form shown, in which the members 1 and 5 are rotatably connected by means of a screw thread, the pitch of the thread is such that a plurality of turns may be made within a range of axial movement less than the axial length of the faces 8 and 9 and 7 and 10, so that within this range of movement these faces are certain to engage one another to hold the collar 11 in such manner that it will respond to the camming action of member 5 rotating relative to it.

In operation, the body 1, collar 11 and sleeve 5 are assembled as in Figs. 1, 2, and the elements then relatively rotated until their longitudinal passages 13 are axially in line, Fig. 3, to receive the connecter or member to be locked. In the disclosed embodiment the passages 13 are preferably formed to be in alignment, in one position, when the sleeve 5 is unscrewed one-half turn from the farthest position to which it may be screwed on the member 1. Then by rotating the sleeve toward such farthest position in gripping the cable, the clearance between the members 1, 5 and 11 is kept small.

When the elements are in unlocked relation, as in Fig. 3, the collar 11 is usually positioned with one shoulder 9 of the collar near one shoulder 7 of the neck 4, and with the thin collar wall section 17 adjacent the thick wall section 15 of the sleeve 5.

As the sleeve 5 is turned relative to the body 1, away from the position in which the bores 13 are all in alignment as shown in Fig. 3, contact of the shoulders 9 and 8, or 10 and 7 depending on the direction of rotation, prevents the collar or gripper 11 from simply remaining in fixed relation to the member 5 as the parts 1 and 5 are relatively rotated. The resulting relative camming movement between the members 11 and 5 is responded to by the member 11, herein by rotating within the eccentric bore 12, (and thus moving about on the end of the member 1 with a combined sliding of the contacting shoulders and a rocking of the member 11 about the point of contact thereof), moving the thick wall 16 of the collar 11 with a slight twisting action, toward the position indicated in Fig. 4, securely gripping the cable or other member 14, Fig. 4. In this figure the cable 14 is cut away so as not to obscure the cooperating parts of the members 1 and 11, but the bore 13, as above noted, is extended, in the preferred embodiment, into the member 1 as shown in the drawing, so that the conductor 14 may extend therein, this being the preferred degree of insertion, as such insertion will cause lateral displacement of an intermediate part of the conductor 14, with a resulting double offset of it, once at the junction of the collar 11 with the sleeve 5, as shown, and a second time, in a similar manner, at the junction of the collar 11 with the neck 4.

As will be apparent from Figure 4, the relative size and eccentricity of the bores 12 and 13 determine the extent of maximum throw of the portion 16 of the gripper 11 across the bore 13 of the relatively rotatable members 1 and 5, and thus determine the range of sizes of conductors 14 which may be secured by a given connecter. A conductor 14 very resistant to distortion and closely fitting the bore 13 will obviously be tightly gripped upon a relatively small degree of relative rotation of the members 1 and 5; a smaller conductor 14 will be tightly gripped upon a larger degree of such relative rotation; and with a fairly yieldable conductor 14, as that shown, the portion of the conductor within the collar or gripper 11 may be materially displaced after being gripped, as shown, to produce a most satisfactory electrical connection and a mechanical connection extremely resistant to pulling out.

In this manner a most reliable and almost undetachable hold is acquired by the connecter upon the cable or rod and, particularly if the collar is corrugated.

In Figures 8 and 9, the members 1 and 5 are similar to the members 1 and 5 of Figures 1–7, and operate in a similar manner.

Obviously this connecter is very effective and compact, and therefore desirable to a high degree for use particularly in work where, either the space provided is limited, or connections are numerous and crowded closely together, as is frequently the case in panel or junction boxes.

The connection may be used advantageously also for connecting cables or other members, as rods, of any kind, in many kinds of industry.

My invention is not restricted to the precise embodiment thereof described and illustrated.

What is claimed is:

1. A device of the class described comprising two axially aligned relatively rotatable members, one sleeved over the other and secured thereon so as to be axially rotatable but held against lateral displacement; said members being bored concentrically with their axis of relative rotation to receive a cable to be gripped, and one of said members being internally counterbored eccentric to said axis of relative rotation; a ring-like member seated in said counterbore and having an eccentric opening located to align in one position of said ring-like member with the bore in said members, said ring-like member and the other of said axially aligned members being provided with interengaging stops formed to provide clearance for the operation of said ring-like member to prevent said ring-like member from remaining in relatively fixed relation to said counterbore during relative rotation of said aligned members thus to cause the wall of said counterbore to turn around the ring-like member cammingly to operate the latter as said axially aligned members are relatively rotated.

2. A connecter for conductors and the like comprising a body member having a threaded neck thereon, a stop member on said neck, a ring-like collar with a stop on the edge thereof adjacent said neck cooperating with said stop member, a sleeve member threaded to engage the threads of said neck; said body and sleeve members being bored concentrically, said collar being bored eccentrically relative to its longitudinal axis, and said sleeve member being counterbored eccentrically to receive said collar; whereby said body and sleeve members are relatively rotatable to one position in which their bores and that of said collar provide a passage to receive a rod-like member end, and are relatively rotatable to another position in which said collar is caused to project into said passage and grip the rod.

3. A connecter for conductors and the like comprising a body member having a neck with fastening means thereon, a stop member on the end of said neck, a ring-like collar of smaller diameter than said neck, said collar being formed with a stop positioned on the edge thereof adjacent said end of said neck and cooperating with said stop member, a sleeve with fastening means cooperating with said fastening means on said neck; said body and sleeve members being bored concentrically, said collar being bored eccentrically relative to its longitudinal axis, and said sleeve member being counterbored eccentrically to receive said collar; whereby said body and sleeve members are relatively rotatable to one position in which their bores and that of said collar provide a passage to receive a rod-like member, and are relatively rotatable to another position in which said collar is caused to project into said passage and grip the rod.

4. A device of the class described comprising, in combination, a first member, a second member rotatably secured to said first member, at least one of said members having a passage to receive a conductor or the like substantially concentric with the axis of rotation of said second member, a gripper intermediate said members mounted to rotate relative to said second member about an axis eccentric to the axis of rotation of said second member, said gripper having an opening eccentric to the axis of relative rotation of said gripper and formed to advance by such rotation transversely of said passage to grip the conductor or the like inserted in said passage and bore and to be retracted in one position from gripping relation relative to said passage, and positive abutment means interengaging said gripper with said first member and formed to enforce operation of said gripper as said members are relatively rotated.

5. A device of the class described comprising, in combination, a first member, a second member rotatably secured to said first member, both of said members having a passage to receive a conductor or the like substantially concentric with the axis of rotation of said second member, a gripper intermediate said members mounted to rotate relative to said second member about an axis eccentric to the axis of rotation of said second member, said gripper being formed with a bore eccentric to the axis of relative rotation of said gripper and formed to advance by such rotation transversely of said passage to grip the conductor or the like and to be retracted in one position from gripping relation relative to said passage, and positive abutment means interengaging said gripper with said first member and formed to enforce operation of said gripper as said members are relatively rotated.

6. A device of the class described comprising, in combination, a first member, a second member rotatably secured to said first member, at least one of said members having a passage to receive a conductor or the like substantially concentric with the axis of rotation of said second member, a rigid gripper intermediate said members mounted on one of said members for relative rotation about an axis eccentric to the axis of relative rotation of said members, said gripper having a bore eccentric to the axis of relative rotation of said gripper and formed to advance transversely of said passage to grip the conductor or the like inserted in said passage and bore and to retract in one position from gripping relation relative to said passage, and positive interengaging means associating said gripper with the other of said members and formed to enforce operating movement of said gripper as said members are relatively rotated.

7. A device of the character described having, in combination, a pair of generally aligned, relatively rotatable members at least one of which is formed with a perforation for receiving a cable or the like, a cable gripping means formed with an opening for receiving a portion of a cable received by said perforation, said cable gripping means being operatively mounted on one of said members for rotation on an axis eccentric to the axis of relative rotation of the members and the opening in said cable gripping means being eccentric to the axis of rotation of said means, and means comprising interengaging abutments operatively formed on the other of said members and on said cable gripping means, respectively, for enforcing operation of the latter about its axis relative to said member on which it is operatively mounted when said members are rotated relative to each other to move the opening of said cable gripping means transversely relative to said perforation.

8. A device of the character described having, in combination, a pair of generally aligned, relatively rotatable members both of which are formed with aligned perforations forming a passage for receiving a cable or the like, a cable gripping means formed with an opening for receiving a portion of a cable received in said passage, said cable gripping means being operatively mounted on one of said members for rotation on an axis eccentric to the axis of relatative rotation of said members and the opening in said means being eccentric to the axis of rotation of said means, and means comprising interengaging abutments operatively formed on the other of said members and on said cable gripping means, respectively, for enforcing operation of said cable gripping means about its axis relative to said member on which it is operatively mounted when said members are rotated relative to each other to move the opening of said cable gripping means transversely relative to said passage for causing gripping of the cable.

9. A device of the character described comprising a plurality of relatively aligned elements two of which are axially engaged, bored axially to receive a rod or cable, and provided with means associating and restraining them against axial separation or lateral displacement under axial and lateral stresses while providing for relative rotation therebetween, a rigid gripper element having a bore and positioned intermediate said first two elements and movable laterally therebetween to provide in receiving position a straight cable passage extending from bore to bore of said first two elements, and being progressively movable across said passage from said receiving position for positioning said bore of said gripper out of alignment with the other of said bores to distort and hold the rod or cable, and means operatively interconnecting said gripper element with said first two elements comprising an eccentric mounting for said gripper on one of said members and means for restraining said gripper against rotation relative to the other of said members to move the same toward or from receiving position as said first two elements are relatively rotated.

ALFRED J. HIXON.